(No Model.)

L. C. DEES.
DUMPING WAGON.

No. 296,938. Patented Apr. 15, 1884.

Witnesses:
A. Ruppert
E. Cruse

Inventor:
Lemuel C. Dees,
by Gtt. M. J. Hunt, atty

UNITED STATES PATENT OFFICE.

LEMUEL C. DEES, OF LAKE CHARLES, LOUISIANA.

DUMPING-WAGON.

SPECIFICATION forming part of Letters Patent No. 296,938, dated April 15, 1884.

Application filed February 1, 1884. (No model.)

*To all whom it may concern:*

Be it known that I, LEMUEL C. DEES, of Lake Charles, in the parish of Calcasieu, in the State of Louisiana, have invented certain new and useful Improvements in Dumping Wagons or Carts, of which the following is a specification.

My invention has reference to dumping wagons and carts; and the said invention consists in the improvements hereinafter described, whereby the body may be readily and expeditiously detached or upset from the front of the vehicle, and the operative parts permitting such detachment made of greater simplicity and durability than heretofore.

Figure 1:
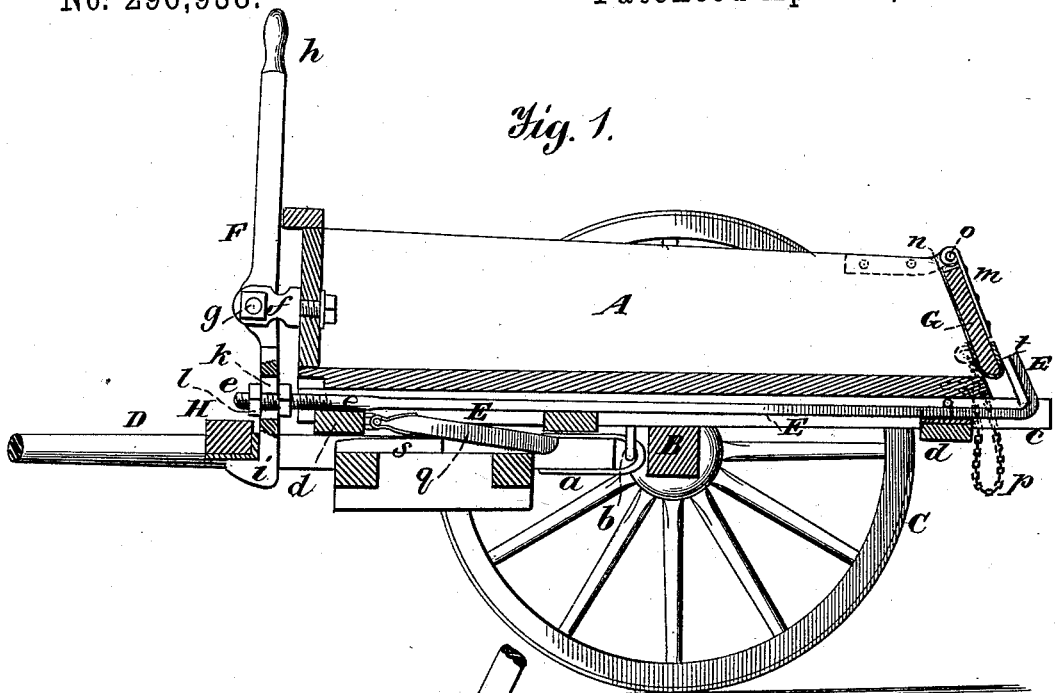
Figure 2:
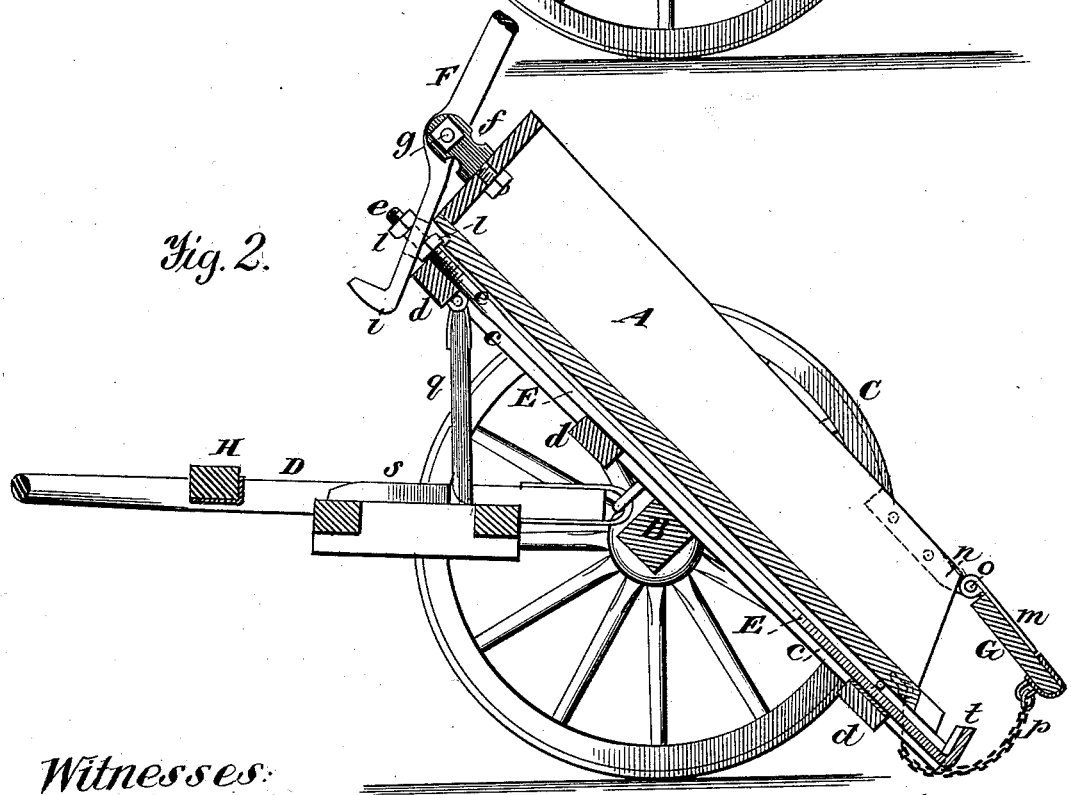

In the accompanying drawings, forming part of this specification, Figure 1 is a central longitudinal sectional view of a dumping-cart constructed in accordance with my invention. Fig. 2 is a similar view, the body being upset.

The cart-body A is rigidly mounted on the axle B, upon the ends of which turn the carrying-wheels C. The rear ends of the shafts D carry links $a$, which engage similar links, $b$, depending from the under side of the body A, and thus afford a pivotal draft-connection of said shafts with the body. Bars $c$ are secured longitudinally at each side of the bottom of the body A, and to these are secured transverse bars $d$, which are notched at their central upper faces to receive and guide a longitudinal bolt-bar, E, the forward end, $e$, of which is cylindrical and threaded, and projects a short distance beyond the front of the cart-body. A bracket, $f$, secured on the front of the body A, supports pivotally by a bolt, $g$, a lever, F, the upper end of which is provided with a handle, $h$, while the lower portion is bent to form a hook, $i$, which, when the upper end is thrown back, takes under and engages a bar, H, secured transversely across the shafts D. The lever F is provided with a vertical slot, $k$, through which projects the threaded end of the bar E, to which it is secured by a nut, $l$. The end-gate G is pendently pivoted by loop-straps $m$ to similar loops, $n$, a securing-bolt, $o$, passing through both loops to connect the parts together. The rear end of the bolt-bar E is arranged to form a hook, which, when the bar is in the position shown in Fig. 1, bears centrally against the end-gate G, and prevents any movement of the same. A chain or cable, $p$, is secured at each side of the rear end of the cart-body, and is adapted to engage a hook located on the end-gate G, so as to limit the swinging movement of said gate. A bar, $q$, secured at the forward end and on the under side of the cart-body A, is adapted, when the said body is tilted, to fall down in a vertical position, and come in contact with and be braced by a block, $s$, secured to the cross-bars attached to the shafts of the vehicle. By this construction the cart will be readily maintained in its tilted position.

The operation will be readily understood. By moving the upper end of the lever F, so as to effect the disengagement of the lower hooked end thereof with the cross-bar attached to the shafts, and also causing a rearward movement of the bolt-bar E, the hook $t$ on said bar is moved from contact with the end-gate G, thus permitting the gate to open under the pressure of the load, while the body is tilted, as shown in Fig. 2, the cables $p$, by limiting the swinging movement of the end-gate, allowing the same to act as a smoothing medium, and also, by altering the cable-connections, regulate the unloading. By this means the cart will be specially useful in grading operations.

I claim—

1. The combination, in a dumping-cart, of the body suitably mounted and pivoted, a bar adapted to move longitudinally in guides located on the under side of the body, and adapted to hold the end-gate in a closed position, a lever pivotally secured on the cart-body, and capable of securing the body in proper position, and adjustably connected to the said longitudinal bar, substantially as and for the purpose set forth.

2. The combination, in a dumping-cart, of the body suitably mounted, and provided with devices for securing the body in proper position and for maintaining the end-gate in a closed position, and connected to each other, to be simultaneously withdrawn, and an end-gate, G, pivoted as described, and limited in its movements by chains or cables, substantially as set forth.

3. The combination, in a dumping-cart, of the body, pivoted as described, body and end-gate devices, connected and operating as set forth, and a bar secured pivotally on the under side of the body, and adapted, when said body is tilted, to come in contact with and be braced by a block secured between the shafts, substantially as specified.

In testimony whereof I have hereunto set my hand this 21st day of January, A. D. 1884.

L. C. DEES.

Witnesses:
JULIEN RICHARD,
A. M. MAYO.